(12) United States Patent
Kim

(10) Patent No.: US 6,646,891 B2
(45) Date of Patent: Nov. 11, 2003

(54) APPARATUS FOR ADJUSTING A HEIGHT OF CONTROL BOXES

(75) Inventor: Hak Shin Kim, Masan (KR)

(73) Assignee: Volvo Construction Equipment Holding Sweden AB (SE)

( * ) Notice: Subject to any disclaimer, the term of this patent is extended or adjusted under 35 U.S.C. 154(b) by 0 days.

(21) Appl. No.: 10/212,590

(22) Filed: Aug. 5, 2002

(65) Prior Publication Data

US 2003/0112583 A1 Jun. 19, 2003

(30) Foreign Application Priority Data

Dec. 18, 2001 (KR) .................. 10-2001-0080590

(51) Int. Cl.[7] .................................................. H02B 1/04
(52) U.S. Cl. ...................................... 361/810; 180/334
(58) Field of Search ................. 414/541, 812, 414/917, 921; 280/DIG. 5; 296/63, 68.1; 307/9.1, 10.1; 361/600, 807–810; 187/224; 74/471 R, 484 R; 180/330, 331, 333, 334

(56) References Cited

U.S. PATENT DOCUMENTS 4,941,797 A * 7/1990 Smillie, III ................ 414/462
4,987,976 A * 1/1991 Daugherty .................. 187/243
5,409,080 A * 4/1995 Templeton et al. ......... 180/326
5,890,562 A * 4/1999 Bartels et al. .............. 187/224

* cited by examiner

Primary Examiner—Gerald Tolin
(74) Attorney, Agent, or Firm—Harness, Dickey & Pierce, P.L.C.

(57) ABSTRACT

The present invention relates to an apparatus for adjusting a height of control boxes, which enables a driver to drive with an optimal posture according to his body condition by adjusting a height of the control boxes having operation levers.

The apparatus for adjusting a height of control boxes according to the present invention distributes a weight of the control boxes to the upper and lower arms not to be directly transferred to the adjustment shaft, so a large force is not required for the rotations of the adjustment shaft, and, by using the same rotation shaft, has an advantage of enabling the left and right control boxes to simultaneously and constantly have the same height.

4 Claims, 7 Drawing Sheets

7

APPARATUS FOR ADJUSTING A HEIGHT OF CONTROL BOXES

BACKGROUND OF THE INVENTION

1. Field of the Invention

The present invention relates to an apparatus for adjusting a height of control boxes, and more particularly to an apparatus for adjusting a height of control boxes, which is mounted on the left and right sides of a driver's seat and adjusts a height of control boxes each installed with operation levers to enable a driver to drive with an optimal posture according to his body condition.

2. Description of Prior Art

In general, drivers operating heavy equipment repeat the same job for a long time in a specific posture and feel severe fatigue. In particular, in case that operation lever heights are not fit for various drivers' bodies, the drivers' fatigue becomes more serious, and, what is worse, the possibility of safety incidents goes up. Accordingly, diverse researches and developments have been performed on control levers and a height-adjusting apparatus of a levers-mounted control box.

A conventional apparatus for adjusting a height of control boxes, as shown in FIG. 1, adjusts the height of a the control box mounted on a vertical bar 3 with the linear movements of the vertical bar 3 through bevel gears 2a and 4a while an adjustment knob 1 is rotated.

However, in the conventional apparatus for adjusting a height of control boxes, a weight of a control box is loaded on a adjustment knob, so that a larger force is exerted to rotate the adjustment knob, what is worse, causing a problem damaging gears by the larger force.

Further, in the prior art, an height-adjusting apparatus is installed on the left and right sides, respectively, for the left and right control boxes, so the heights of the left and right control boxes can not be adjusted to the position of the same level.

SUMMARY OF THE INVENTION

It is an object of the present invention to provide an apparatus for adjusting heights of control boxes which prevents control box weights from being directly loaded on an adjustment knob and enables easy adjustments with less force.

It is another object of the present invention to provide an apparatus for adjusting heights of control boxes which enables the left and right control boxes of a driver' seat to be adjusted to the same height.

In order to achieve the above objects, the present invention comprises a base plate mounted on the bottom of a driver's seat; a pair of upper arms and a pair of lower arms, the upper side of one upper arm being hinged to the upper side of another upper arm by a first pin, the lower side of one lower arm being hinged to the lower side of another lower arm by a second pin, and the lower sides of the pair of upper arms being hinged to the upper sides of the pair of lower arms by adjustment pins respectively; an adjustment shaft screw-coupled to at least one of the adjustment pins and having spirals adjusting a distance between the adjustment pins when rotating; and a first rotary arm one end of which is vertically fixed to one end of a rotation bar rotatably supported by the base plate and the other end of which is coupled to one of the first and second pins, a pin of the first and second pins which is not coupled being fixed to the based plate and the first rotary arm being coupled to one control box.

In an embodiment of the present invention, the base plate further comprises a rotation shaft for the control boxes, so that the control boxes rotates about the rotation shaft for the control boxes.

In another embodiment of the present invention, a second rotary arm being symmetrical to the first rotary arm and one end of which is fixed to the other end of the rotation bar is further included to adjust a height of the other control box coupled to the second rotary arm to be equal to a height of the one control box.

In another embodiment of the present invention, a motor coupled to the adjustment shaft, equipped with a control switch, and rotating the adjustment shaft is further comprised, so that the height of control boxes is adjusted by operating the motor.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE INVENTION

Hereinafter, a description is made on an apparatus for adjusting a height of control boxes according to a preferred embodiment of the present invention with reference to the accompanying drawings, which is for explaining in detail the present invention to be easily embodied by one skilled in the art to which the present invention pertains but not for defining the technical spirit and scope of the present invention.

Figure 1:
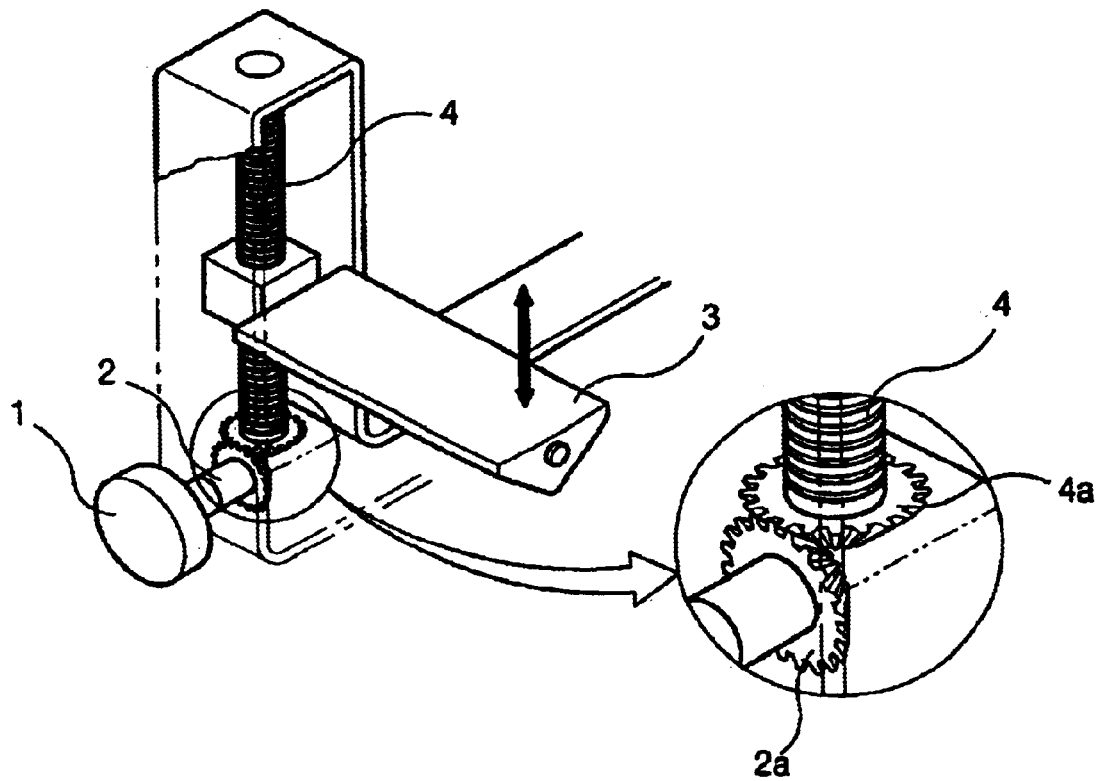
FIG. 1 is a perspective view for showing a main part of a conventional apparatus for adjusting a height of control boxes.
Figure 2:
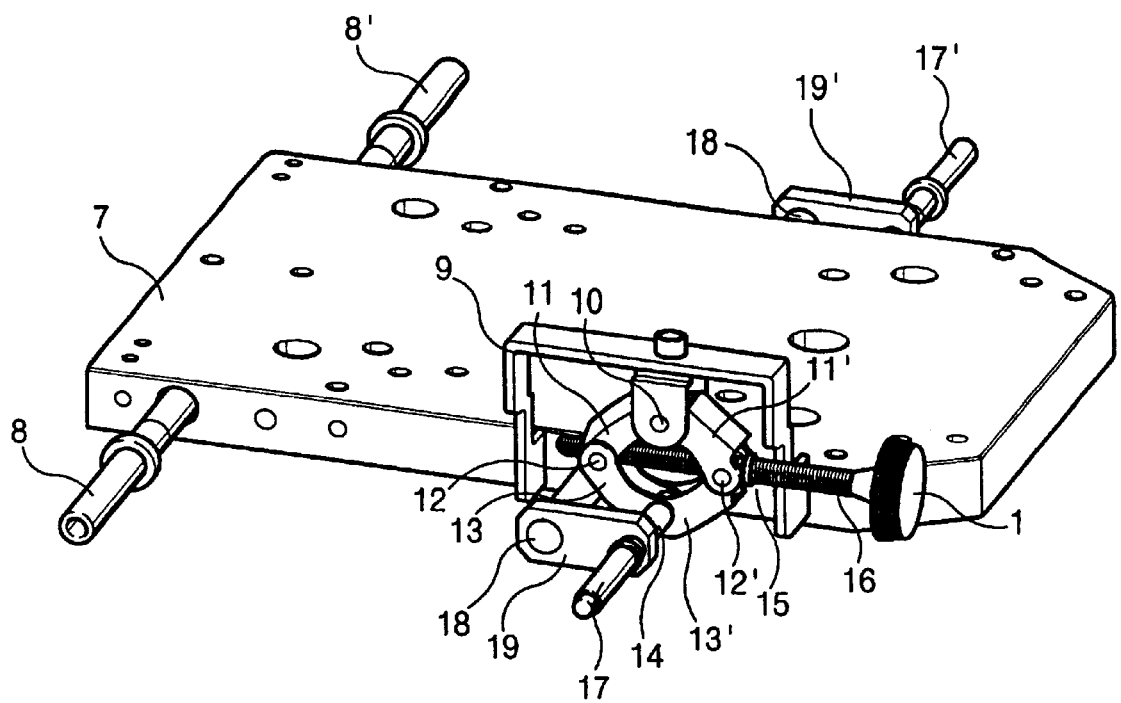
FIG. 2 is a perspective view for showing an apparatus for adjusting a height of control boxes according to an embodiment of the present invention.
Figure 3:
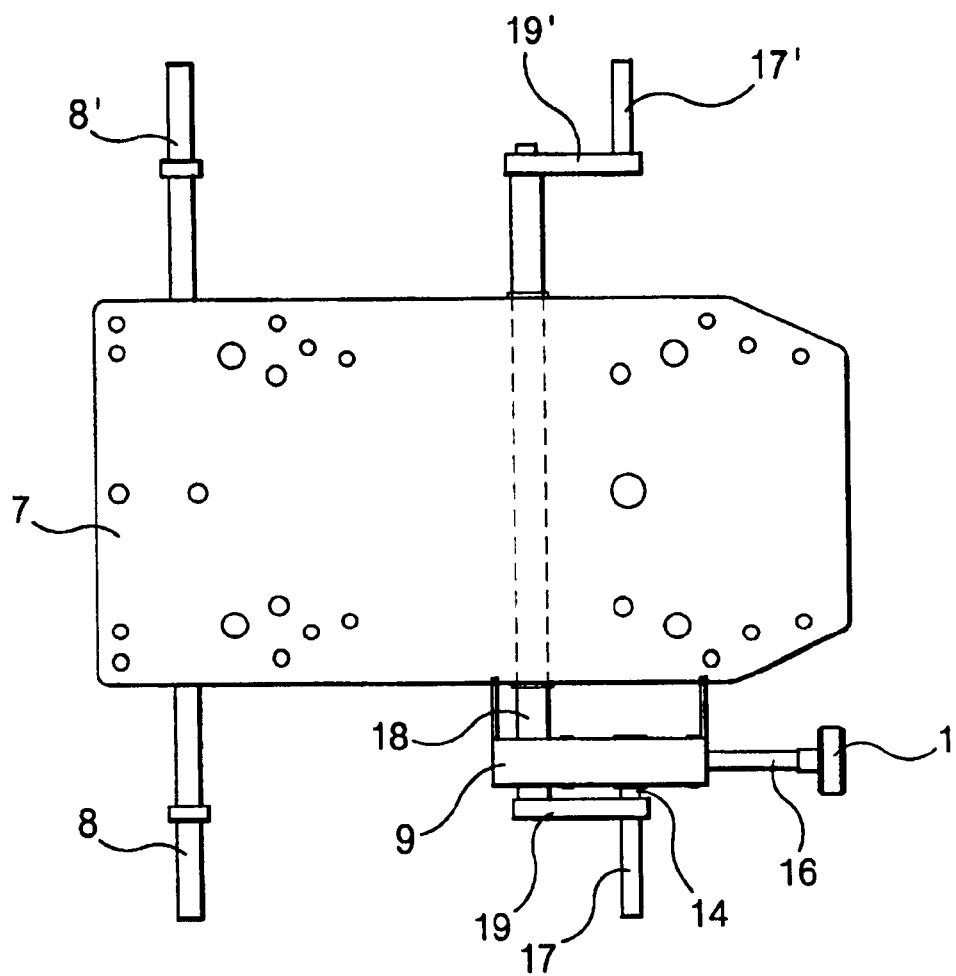
FIG. 3 is a front view for showing an apparatus for adjusting a height of control boxes according to an embodiment of the present invention.
Figure 4:
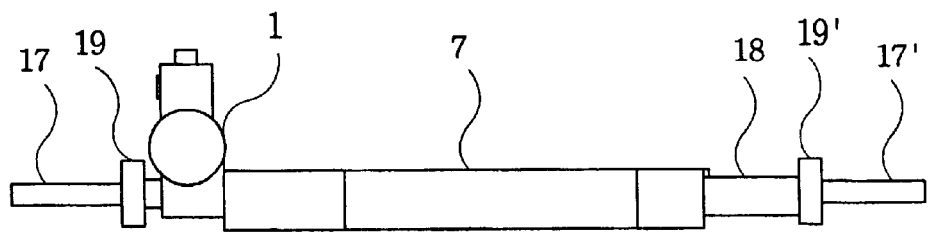
FIG. 4 is a side view for showing an apparatus for adjusting a height of control boxes according to an embodiment of the present invention.
Figure 5:
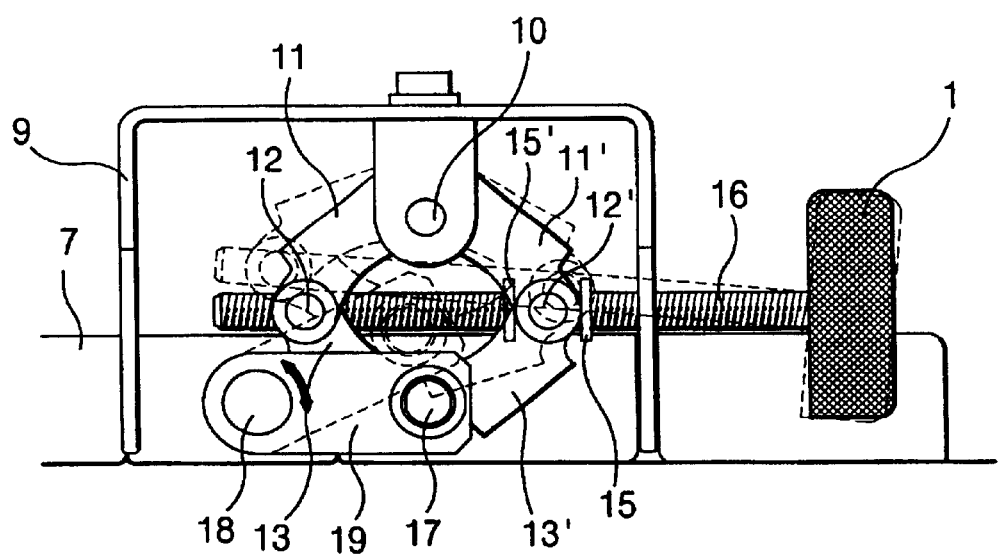
FIG. 5 is a side view for showing operation states of an apparatus for adjusting a height of control boxes according to an embodiment of the present invention.

FIG. 2 is a perspective view for showing an apparatus for adjusting a height of control boxes for heavy equipment according to an embodiment of the present invention, FIG. 3 is a front view for showing an apparatus for adjusting a height of control boxes according to an embodiment of the present invention, FIG. 4 is a side view for showing the height-adjusting apparatus, and FIG. 5 is a side view for showing operation states of the height-adjusting apparatus according to an embodiment of the present invention.

As shown in the drawings, an apparatus for adjusting a height of control boxes according to a preferred embodiment of the present invention includes a base plate 7 fixedly bolted to the bottom of a driver's seat 5 in order to adjust a height of a control box 6 in which operation levers 6a is mounted; control box rotation shafts 8 and 8' fixedly welded to both sides of the rear of the base plate 7 respectively; a bracket 9 fixed on the right side of the base plate 7; a pair of upper arms 11 and 11' and a pair of lower arms 13 and 13' wherein the upper side of one upper arm 11 is hinged to the upper side of another upper arm 11' by a first pin 10, the lower side of one lower arm 13 is hinged to the lower side of another lower arm 13' by a second pin 14, the lower sides of the pair of upper arms 11 and 11' are hinged to the upper is sides of the pair of lower arms 13 and 13' by adjustment pins 12 and 12' respectively; an adjustment shaft 16 mounted to traverse the pair of adjustment pins 12 and 12', screw-coupled to one of the adjustment pins 12 and 12', and having stoppers 15 and 15' fixing a position of the other adjustment pin, and an adjustment knob 1 formed on the adjustment shaft 16; a right rotary arm 19 one end of which is fixed to the right side of rotation bar 18 rotatably passing through the left and right sides of the base plate 7 and the other end of which is fixed to the second pin; and a right-side control box mount 17 fixed to the right rotary arm and on which a right-side control box is installed.

The embodiment of the present invention further comprises a left-side rotary arm 19' fixed to the left side of the rotation bar 18, and a left-side control box mount 17' rotatably coupled to the left-side rotary arm 19' and on which a left-side control box is installed.

In the above embodiment, the second pin may be fixed to the base plate and the first pin may be coupled to the control boxes for the same functions.

Figure 6:
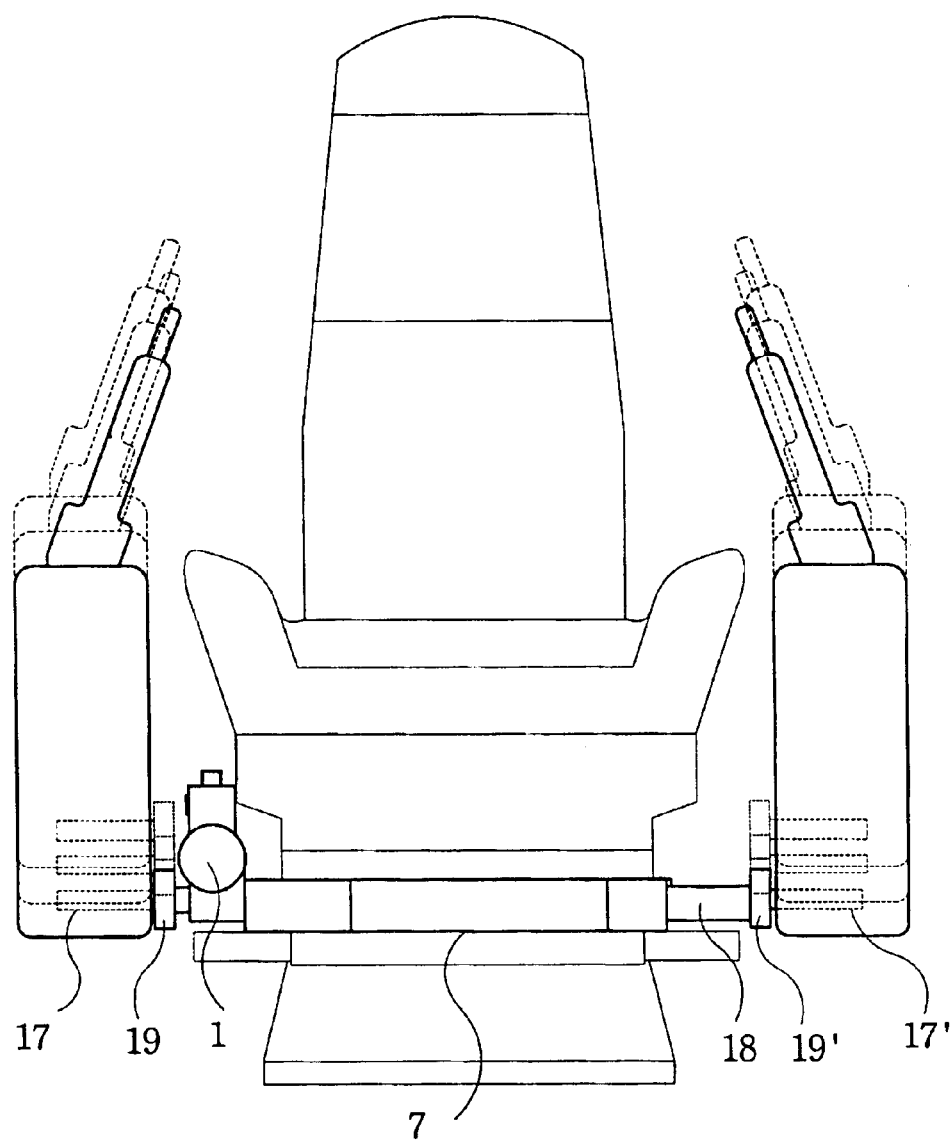
FIG. 6 is a front view of a driver's seat by which an apparatus for adjusting a height of control boxes according to an embodiment of the present invention is mounted.
Figure 7:
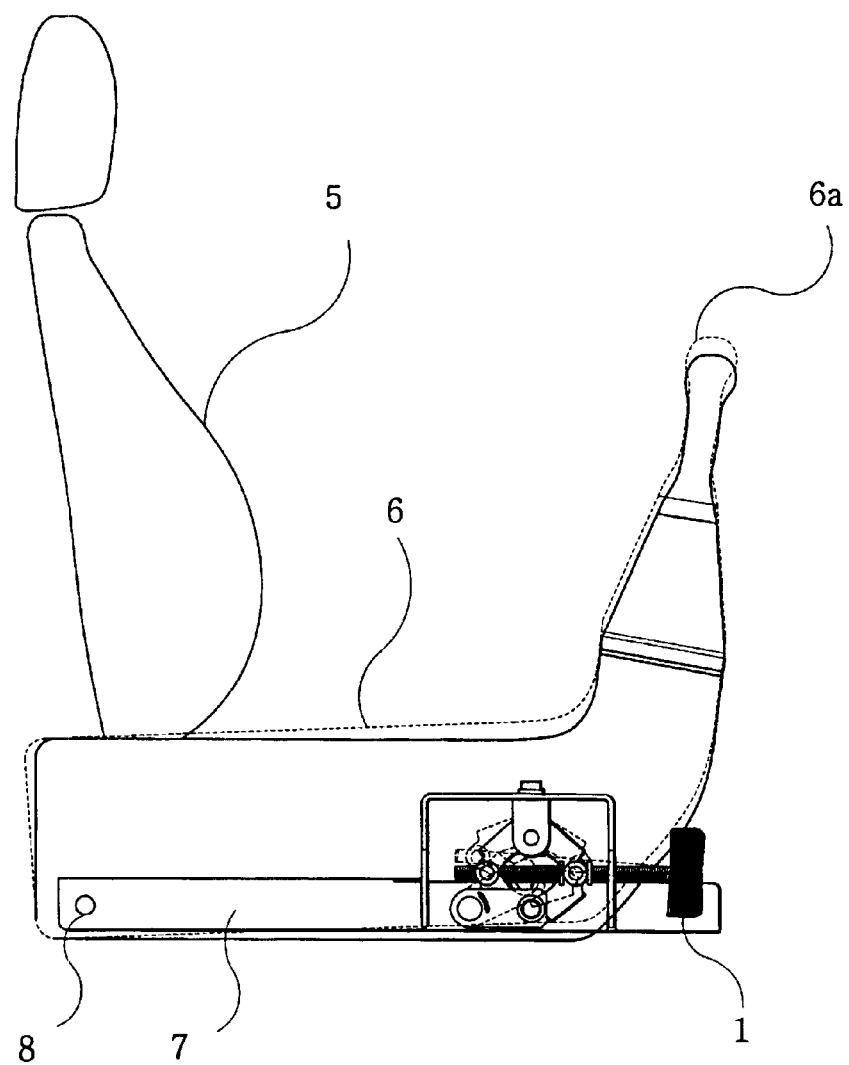
FIG. 7 is a side view of a driver's seat by which an apparatus for adjusting a height of control boxes according to an embodiment of the present invention is mounted.

FIG. 5 shows operation states of an apparatus for adjusting a height of control boxes according to an embodiment of the present invention, FIG. 6 is a front view of a driver's seat by which an apparatus for adjusting a height of control boxes according to an embodiment of the present invention is mounted, and FIG. 7 is a side view of the driver's seat.

With the above structure, as a driver rotates the adjustment knob 1, the adjustment pin 12 moves to the left or right so that a distance between the adjustment pins 12 and 12' are adjusted, and the right-side rotary arm coupled to the is second pin rotates about the rotation bar 18 to rotate the rotation bar 18.

If the left-side rotary arm 19' coupled to the other end of the rotation bar rotates as the rotation bar rotates, even the left-side control box mounted on the left-side control box mount 17' is adjusted to the same height as the right-side control box.

Figure 8:
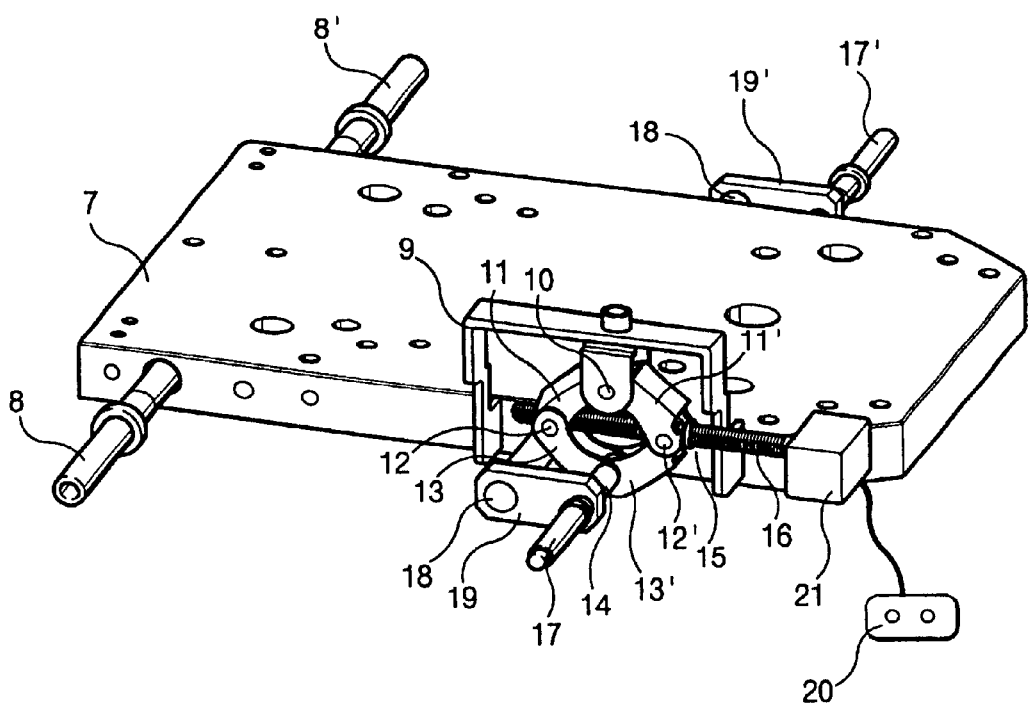
FIG. 8 is a perspective view for showing an apparatus for adjusting a height of control boxes according to another embodiment of the present invention.

FIG. 8 shows another embodiment of an apparatus for adjusting a height of control boxes according to the present invention, further including a motor 21 coupled to the adjustment shaft 16, equipped with a control switch 20, and for rotating the adjustment shaft 16.

The rotations of the adjustment shaft 16 due to the rotation of the motor 21 ascend and descend the left and right control box mounts 17 and 17' through the above mentioned operations to adjust a height of the control boxes.

The apparatus for adjusting a height of control boxes as above according to the present invention distributes a weight of the control boxes to the upper and lower arms not to be directly transferred to the adjustment shaft, so a large force is not required for the rotations of the adjustment knob as well as there is no way the gears become damaged or disenabled in use, bringing an advantage of enabling to simultaneously and constantly have the same height the control levers respectively mounted on the left and right sides of the driver's rotary seat by means of the rotation shaft rotatably passing through the both sides of the base plate.

In addition, the motor coupled to the adjustment shaft enables the adjustments of the height of the control boxes conveniently only with operations of a control switch.

The entire disclosure of Korean Patent Application No. 2001-0080590 filed Dec. 18, 2001 is hereby incorporated by reference.

What is claimed is:

1. An apparatus for adjusting a height of control boxes, comprising:
    a base plate mounted on the bottom of a driver's seat;
    a pair of upper arms and a pair of lower arms, the upper side of one upper arm being hinged to the upper side of another upper arm by a first pin, the lower side of one lower arm being hinged to the lower side of another lower arm by a second pin, and the lower sides of the pair of upper arms being hinged to the upper sides of the pair of lower arms by adjustment pins respectively;
    an adjustment shaft screw-coupled to at least one of the adjustment pins and having spirals adjusting a distance between the adjustment pins when rotating; and
    a first rotary arm one end of which is vertically fixed to one end of a rotation bar rotatably supported by the base plate and the other end of which is coupled to one of the first and second pins, a pin of the first and second pins which is not coupled being fixed to the based plate and the first rotary arm being coupled to one control box.

2. The apparatus as claimed in claim 1, wherein the base plate further comprises a rotation shaft for the control boxes, so that the control boxes rotates about the rotation shaft for the control boxes.

3. The apparatus as claimed in claim 1, wherein a second rotary arm being symmetrical to the first rotary arm and one end of which is fixed to the other end of the rotation bar is further included to adjust a height of the other control box coupled to the second rotary arm to be equal to a height of the one control box.

4. The apparatus as claimed in claim 3, further comprising a motor coupled to the adjustment shaft, equipped with a control switch, and rotating the adjustment shaft.

* * * * *